United States Patent
Yamada et al.

(10) Patent No.: US 8,433,466 B2
(45) Date of Patent: Apr. 30, 2013

(54) DRIVE CONTROL APPARATUS FOR HYBRID ELECTRIC VEHICLE AND METHOD FOR CONTROLLING THE SAME

(75) Inventors: Kazunao Yamada, Toyota (JP); Yusuke Mizuno, Anjo (JP); Tadashi Sakai, Obu (JP); Yasushi Sakuma, Chita-gun (JP)

(73) Assignee: Denso Corporation, Kariya (JP)

( * ) Notice: Subject to any disclaimer, the term of this patent is extended or adjusted under 35 U.S.C. 154(b) by 343 days.

(21) Appl. No.: 12/800,884

(22) Filed: May 25, 2010

(65) Prior Publication Data

US 2010/0305799 A1 Dec. 2, 2010

(30) Foreign Application Priority Data

May 26, 2009 (JP) ................................. 2009-126343
Nov. 25, 2009 (JP) ................................. 2009-267178

(51) Int. Cl.
*B60L 9/00* (2006.01)
*B60L 11/00* (2006.01)
*G05D 1/00* (2006.01)

(52) U.S. Cl.
USPC ...... 701/22; 180/65.1; 180/65.21; 180/65.29; 180/65.275; 180/65.265

(58) Field of Classification Search .................... 701/22; 180/6.5; 320/124–136
See application file for complete search history.

(56) References Cited

U.S. PATENT DOCUMENTS

| | | | |
|---|---|---|---|
| 6,314,347 B1 | 11/2001 | Kuroda et al. | |
| 6,381,522 B1 * | 4/2002 | Watanabe et al. | 701/22 |
| 7,849,944 B2 * | 12/2010 | DeVault | 180/65.29 |
| 8,190,318 B2 * | 5/2012 | Li et al. | 701/22 |
| 2008/0021628 A1 * | 1/2008 | Tryon | 701/99 |
| 2009/0030568 A1 | 1/2009 | Amano et al. | |
| 2009/0198398 A1 | 8/2009 | Yamada | |

FOREIGN PATENT DOCUMENTS

| | | |
|---|---|---|
| JP | 08-331772 | 12/1996 |
| JP | 2000-333305 | 11/2000 |
| JP | 2001-183150 | 7/2001 |
| JP | 2005-091112 | 4/2005 |
| JP | 2005-168295 | 6/2005 |
| JP | 2007-223357 | 9/2007 |
| JP | 2009-101983 | 5/2009 |
| JP | 2009-179215 | 8/2009 |

OTHER PUBLICATIONS

Office action dated Mar. 8, 2011 in corresponding Japanese Application No. 2009-267178.
U.S. Appl. No. 12/592,876, filed Dec. 3, 2009 Yamada et al.

\* cited by examiner

*Primary Examiner* — Thomas Tarcza
*Assistant Examiner* — Tyler J Lee
(74) *Attorney, Agent, or Firm* — Harness, Dickey & Pierce, PLC

(57) ABSTRACT

In a drive control apparatus, an information storing unit collects first and second information at predetermined intervals while the vehicle runs and the information storing unit stores the first and second information in a storage device. A schedule effective section extracting unit extracts a schedule effective section from a route from an origin to a destination based on the second information. A control index storage controlling unit defines the schedule of the control index of each of multiple predetermined sections within the schedule effective section based on the first information such that fuel consumption of the engine is reduced in the schedule effective section, wherein the defined schedule of the control index is stored in the storage device. An assist control process unit performs drive control of a motor and an engine based on the schedule of the control index.

3 Claims, 10 Drawing Sheets

DATA COLLECTING PROCESS — S200

OBTAIN RUNNING INFORMATION — S202

STORE RUNNING HISTORY — S204

END

| SECTION | 1 | 2 | 3 | ... | M | M+1 | M+2 | ... | N |
|---|---|---|---|---|---|---|---|---|---|
| SECTION LENGTH [m] | 500 | 300 | 200 | ... | 400 | 300 | 300 | ... | 400 |
| AVERAGE GRADIENT [%] | -2.0 | -1.0 | 0.0 | ... | -8.0 | -8.0 | -2.0 | ... | 2.0 |
| VEHICLE RESTING RATE [%] | 20.0 | 30.0 | 30.0 | | 0.0 | 0.0 | 0.0 | | 10.0 |
| AVERAGE VEHICLE SPEED [km/h] | 20.0 | 30.0 | 30.0 | ... | 40.0 | 40.0 | 40.0 | ... | 20.0 |
| ELECTRICAL LOAD [W] | 1100 | 1150 | 1100 | | 800 | 800 | 800 | | 800 |
| START SOC [%] | 55.0 | 50.0 | 45.0 | ... | 70.0 | 75.0 | 75.0 | ... | 55.0 |
| END SOC [%] | 55.0 | 45.0 | 40.0 | ... | 75.0 | 75.0 | 70.0 | ... | 55.0 |
| UPPER-LIMIT SOC FLAG | 0 | 0 | 0 | ... | 1 | 1 | 1 | ... | 0 |
| LOWER-LIMIT SOC FLAG | 0 | 0 | 1 | ... | 0 | 0 | 0 | ... | 0 |

| SECTION | 1 | 2 | 3 |
|---|---|---|---|
| GENERATION EFFICIENCY | 7 | 0 | 3 |
| ASSIST EFFICIENCY | 3 | 10 | 7 |
| SCHEDULE | GENERATION | ASSIST | ASSIST |

# DRIVE CONTROL APPARATUS FOR HYBRID ELECTRIC VEHICLE AND METHOD FOR CONTROLLING THE SAME

CROSS REFERENCE TO RELATED APPLICATION

This application is based on and incorporates herein by reference Japanese Patent Application No. 2009-126343 filed on May 26, 2009, and Japanese Patent Application No. 2009-267178 filed on Nov. 25, 2009.

BACKGROUND OF THE INVENTION

1. Field of the Invention

The present invention relates to a drive control apparatus for hybrid electric vehicle that performs drive control of an engine and a motor based on a control index.

2. Description of Related Art

For example, JP-A-2000-333305 and JP-A-2001-183150 shows a drive control apparatus for the hybrid electric vehicle that collects and learns a running history (e.g., vehicle speed) of the vehicle for each of sections, which are predetermined, in a route to a destination. Also, the apparatus sets a schedule of the control index for each predetermined section based on the learned running history and based on road conditions of the route to the destination in order to minimize fuel consumption to the destination. Then, the apparatus controls the engine and the motor based on the schedule of the control index.

More specifically, in the apparatus of JP-A-2000-333305, JP-A-2001-183150, the schedule of the control index is made for the route from the origin to the destination such that the fuel consumption is minimized, and the engine and the motor are controlled in accordance with the schedule of the control index. Because road gradients of the route to be traveled is considered in advance to make the schedule of the control index, it is possible to realize preferable fuel efficiency. However, when the vehicle is not capable of running as determined by the schedule in a certain section of the route to the destination due to the influence caused by traffic jam, the fuel efficiency may deteriorate instead.

SUMMARY OF THE INVENTION

The present invention is made in view of the above disadvantages. Thus, it is an objective of the present invention to address at least one of the above disadvantages.

To achieve the objective of the present invention, there is provided a drive control apparatus mounted to a hybrid electric vehicle that employs an engine and a motor as a running power source, wherein the drive control apparatus performs drive control of the engine and the motor based on a control index, the drive control apparatus having information storing unit, schedule effective section extracting unit, control index storage controlling unit, and assist control process unit. The information storing unit collects first information and second information at predetermined intervals while the vehicle runs and stores the collected first and second information in a storage device. The first information is used for defining the control index, and the second information is used for extracting a schedule effective section from a route from an origin to a destination, in which effective section certain fuel efficiency improvement is obtainable by defining a schedule of the control index and by performing the drive control of the engine and the motor based on the defined schedule. The schedule effective section extracting unit extracts the schedule effective section from the route based on the second information stored in the storage device. The control index storage controlling unit defines the schedule of the control index of each of a plurality of predetermined sections within the schedule effective section based on the first information stored in the storage device such that fuel consumption of the engine is reduced in the schedule effective section, wherein the control index storage controlling unit controls the storage device to store the defined schedule of the control index. The assist control process unit performs the drive control based on the schedule of the control index stored in the storage device.

To achieve the objective of the present invention, there is also provided a method for controlling an engine and a motor of a hybrid electric vehicle based on a state of charge (SOC) of a battery mounted to the vehicle. In the method, first information and second information of each of a plurality of sections within a route from an origin to a destination are collected while the vehicle runs along the route. The collected first and second information of each of the plurality of sections are stored in a storage device. A plurality of continuous sections is extracted as a schedule effective section from the plurality of sections within the route based on the second information stored in the storage device after the vehicle has reached the destination. The continuous sections are located adjacent to each other in the route. A schedule of the SOC for each of the plurality of continuous sections is defined based on the first information stored in the storage device such that fuel consumption of the engine is reduced in the schedule effective section. The defined schedule of the SOC is stored in the storage device. The engine and the motor of the vehicle are controlled based on the schedule of the SOC stored in the storage device when the vehicle runs along the route in a next operation.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
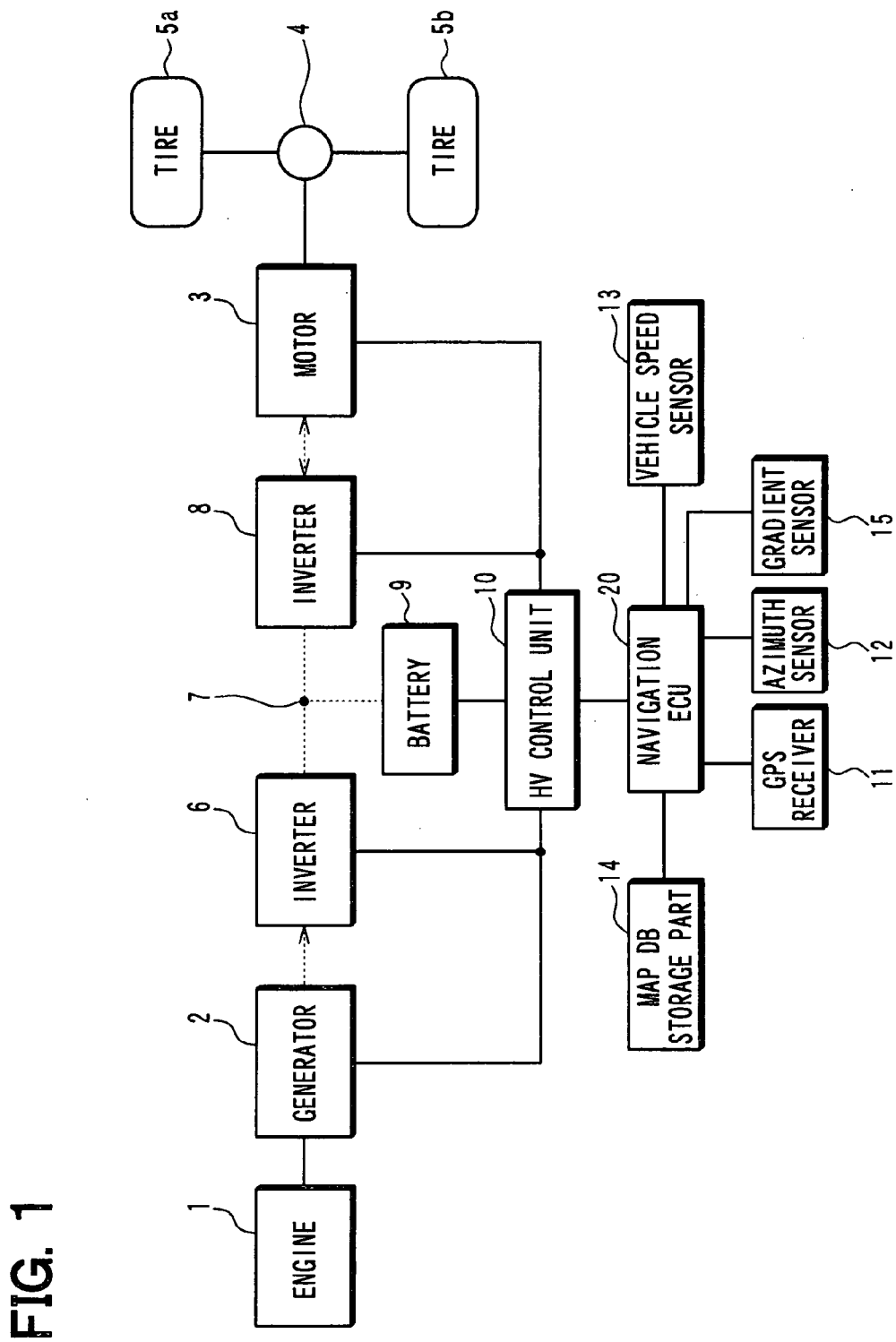
FIG. 1 is a diagram illustrating a configuration of a drive control apparatus for a hybrid electric vehicle according to the first embodiment of the present invention.

FIG. 1 schematically illustrates a general configuration of a vehicle mounted with a drive control apparatus for controlling a hybrid electric vehicle according to the first embodiment of the present invention. The hybrid electric vehicle is equipped with an engine 1 (internal combustion engine), a generator 2, a motor 3, a differential device 4, tires 5a, 5b, an inverter 6, a DC link 7, an inverter 8, a battery 9, an HV control unit 10, a GPS receiver 11, an azimuth sensor 12, a vehicle speed sensor 13, a map DB storage part 14, a gradient sensor 15, and a navigation ECU 20.

The hybrid electric vehicle employs the engine 1 and the motor 3 as a power source for running. When the engine 1 is used as the power source, a turning force of the engine 1 is transmitted to the tires 5a, 5b through clutch mechanism and the differential device 4, both of which are not shown. Also, when the motor 3 is used as the power source, AC power of the battery 9 is converted to DC power through the DC link 7 and the inverter 8, and the DC power drives the motor 3. Then, turning force of the motor 3 is transmitted to the tires 5a, 5b through the differential device 4. A running mode is categorized into the following three modes. In an engine running mode, only the engine 1 is used as the power source. In a motor running mode, only the motor 3 is used as the power source. In an assist running mode, both the engine 1 and the motor 3 are used as the power source.

Also, turning force of the engine 1 is transmitted to the generator 2, and the generator 2 uses the turning force to generate DC power. The generated DC power is converted to AC power through the inverter 6 and the DC link 7, and the AC power is stored in the battery 9. The charge of the battery 9 as above is performed by the operation of the engine 1 by using fuel. Thus, the above charge is referred to as engine charge in the present embodiment.

Also, when a brake mechanism (not shown) slows down the hybrid electric vehicle, a resistance force during the deceleration is applied to the motor 3 as turning force, and the motor 3 generates DC power by using the received turning force. Then, the generated DC power is converted to AC power through the inverter 8 and the DC link 7. The AC power is then stored in the battery 9. The AC power generated as above is referred to as regeneration charge in the present embodiment.

The HV control unit 10 controls execution and non-execution of the above operation of the generator 2, the motor 3, the inverter 6, the inverter 8, and the battery 9 in response to commands from the navigation ECU 20. The HV control unit 10 may be realized by using, for example, a microcomputer, and may be realized by using a hardware having a dedicated circuit configuration for enabling the flowing function.

More specifically, the HV control unit 10 stores two values including a present SOC (State Of Charge) and a reference SOC, and executes the following processes (A) and (B).

In the process (A), the HV control unit 10 controls actuators, such as the generator 2, the motor 3, the inverter 6, the inverter 8, and the battery 9, by changing the value of the reference SOC based on a target SOC such that a charge amount of the battery 9 of the hybrid electric vehicle becomes close to the target SOC. For example, the above target SOC is a control target value that serves as a control index received from the navigation ECU 20.

In the process (B), the present SOC is periodically reported to the navigation ECU 20.

More specifically, the SOC (Battery State of Charge) indicates a residual amount of the battery, and the higher the value of the SOC is, the more residual amount exists in the battery. The present SOC indicates the present value of the SOC of the battery 9. The HV control unit 10 repeatedly updates the value of the present SOC by sequentially detecting the state of the battery 9. The reference SOC serves as a control target value (for example, 60%) used by the HV control unit 10 for determining the control method, such as generation and assist. The value is changeable based on control from the navigation ECU 20.

The HV control unit 10 switches the mode of the hybrid electric vehicle between the engine running mode, the motor running mode, and the assist running mode based on the control target value received from the navigation ECU 20. Also, the HV control unit 10 switches execution and non-execution of the engine charge, and execution and non-execution of the regeneration charge. The control target value of the present embodiment is the target SOC. The HV control unit 10 determines the running method such that the present SOC is maintained around the target SOC, and then the HV control unit 10 executes the control of the actuator based on the determined running method.

Also, when the HV control unit 10 does not receive the control target value from the navigation ECU 20, the HV control unit 10 independently executes the drive control in accordance with the vehicle speed and the accelerator pedal position.

The GPS receiver 11, the azimuth sensor 12, and the vehicle speed sensor 13 are known sensors for detecting the position of the vehicle, the travel direction, and the running speed.

The gradient sensor 15 includes a gyrosensor (not shown) that detects direction change amounts in a pitch direction, a yaw direction, and a roll direction of the vehicle. A road gradient is computable based on the direction change amount in the pitch direction detected by the gyrosensor.

The map DB storage part 14 serves as a storage medium that stores map data. The map data includes (a) node data items that correspond to respective multiple intersections and (b) link data items that correspond to respective links (in other words, road sections between the intersections. Each of the node data items includes an identification number, position information, and type information of the corresponding node. Also, each of the link data items includes an identification number (referred to as link ID), position information, and type information of the corresponding link.

The position information of the link includes position data of a shape formation point within the link, nodes of both ends of the link, and data of segments that are located on both side of the shape formation point. Data of each segment includes an segment ID, a gradient, a direction, and a length of the segment.

Figure 2:
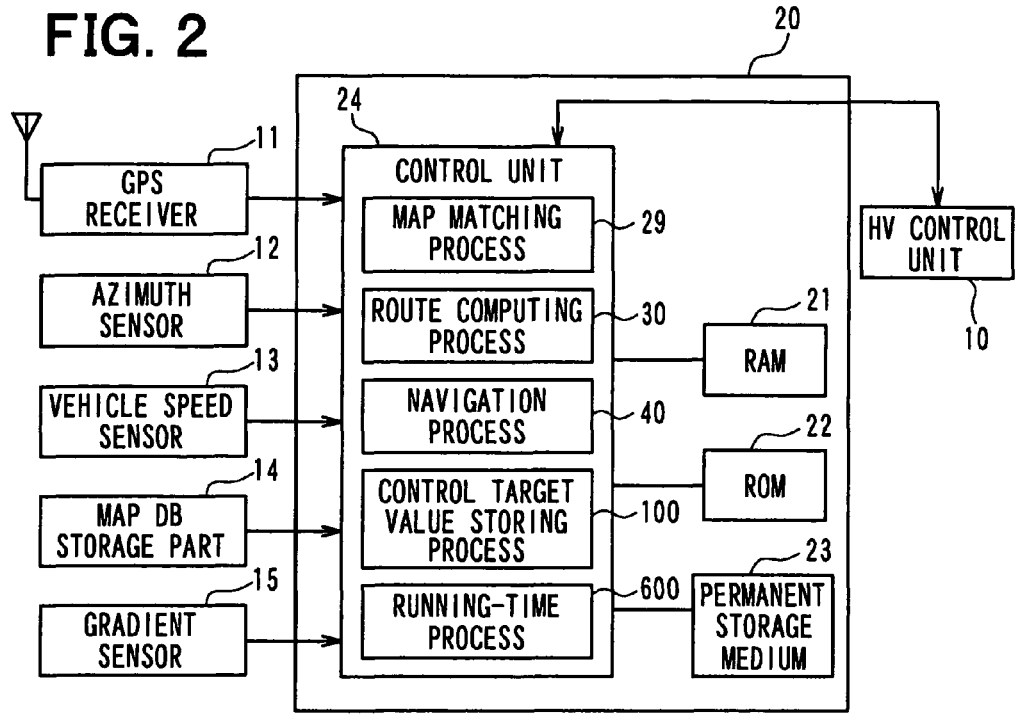
FIG. 2 is a diagram illustrating a configuration of a navigation ECU.

As shown in FIG. 2, the navigation ECU 20 includes a RAM 21, ROM 22, a writable permanent storage medium 23, and a control unit 24. The permanent storage medium 23 is capable of keeping data even when supply from a main power source of the navigation ECU 20 stops. The permanent storage medium 23 may be, for example, a hard disk, a flash memory, a non-volatile storage medium (e.g., EEPROM), and a back-up RAM.

The control unit 24 executes programs retrieved from the ROM 22 or the permanent storage medium 23. In the execution of the programs, the control unit 24 reads information from the RAM 21, the ROM 22, and the permanent storage medium 23 and write information on the RAM 21 and the permanent storage medium 23. Thus, the control unit 24 enables the exchange of signals with the HV control unit 10, the GPS receiver 11, the azimuth sensor 12, the vehicle speed sensor 13, the map DB storage part 14, and the gradient sensor 15.

Specifically, the control unit 24 enables a map matching process 29, a route computing process 30, a navigation process 40, a control target value storing process 100, and a running-time process 600 by executing predetermined programs.

In the map matching process 29, the control unit 24 determines a road in a map of the map DB storage part 14, on which the present position of the vehicle corresponds to, based on position information sets retrieved from the GPS receiver 11, the azimuth sensor 12, and the vehicle speed sensor 13.

In the route computing process 30, the control unit 24 employs the map data to determine an optimum route to a destination designated by the user through an operation apparatus (not shown).

In the navigation process 40, the control unit 24 provides the driver with the guidance for guiding the hybrid electric vehicle to the destination along a travel route by using an image display device and a speaker (not shown).

In the control target value storing process 100, the control unit 24 executes the following process. In the process, the control unit 24 collects first information and second information at every predetermined distance while the vehicle runs along a route from an origin to a destination and causes the permanent storage medium 23 to store the first and second information. Typically, the first information is used for defining a control target value (target SOC), and the second information is used for extracting a schedule effective section from the route from the origin to the destination based on the second information, in which effective section certain fuel efficiency improvement is obtainable by defining the schedule of the control target value and by performing the drive control of the engine and the motor. The schedule effective section is extracted from the route based on the second information stored in the permanent storage medium 23. A schedule of the control target value is defined for each of multiple predetermined sections within the schedule effective section based on the first information stored in the permanent storage medium 23 such that fuel consumption of engine is reduced. Then, the control unit 24 causes the permanent storage medium 23 to store therein the schedule of the control target value. Also, in a running-time process shown in FIG. 11, at the time of the departure of the next running on the route from a certain origin to a certain destination, when it is determined that the schedule of a previously computed control target value of the schedule effective section on the route of interest is stored in the permanent storage medium 23, drive control of the engine and the motor is executed based on the schedule of the control target value stored in the permanent storage medium 23. As a result, it is possible to achieve the running based on highly accurately defined schedule of the control target value.

Figure 3:
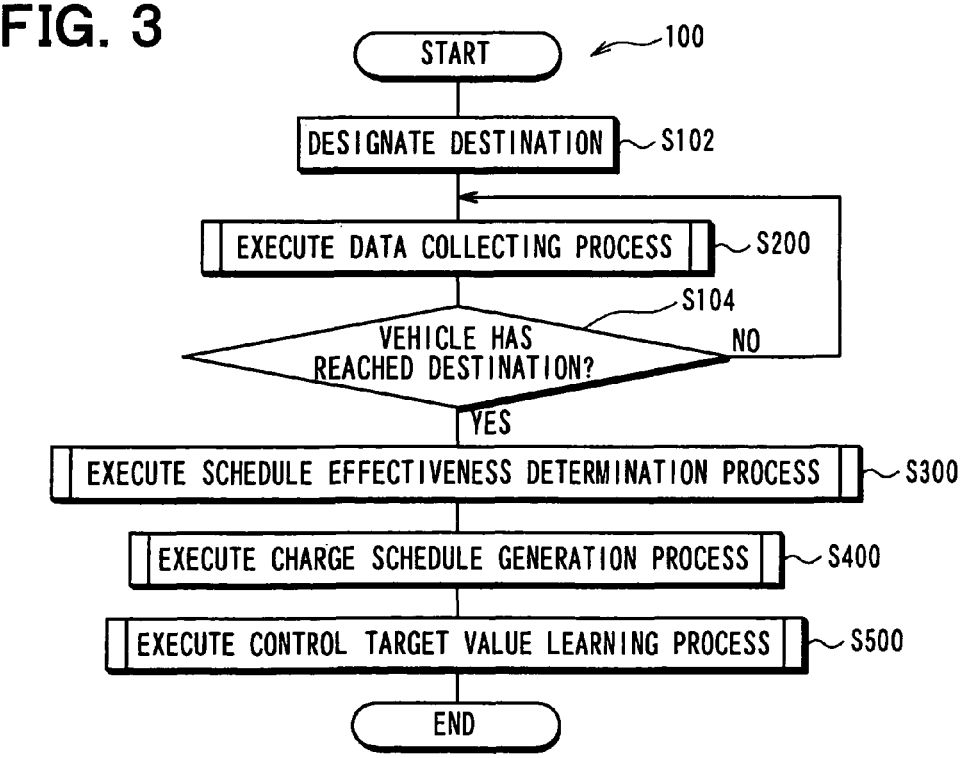
FIG. 3 is a flow chart control illustrating a control target value storing process.

FIG. 3 shows a flow chart of the control target value storing process 100. When an ignition switch of the vehicle is turned on, the drive control apparatus is under operation, and thereby the control unit 24 executes various processes. For example, the control unit 24 executes the process shown in FIG. 3 in response to the operation of the occupant.

Firstly, the destination is designated at S102. Specifically, the screen for requesting the occupant to input the destination is displayed, and a point or a facility designated by the occupant through the operation in the screen is identified or set as the destination.

Figures 4, 5:
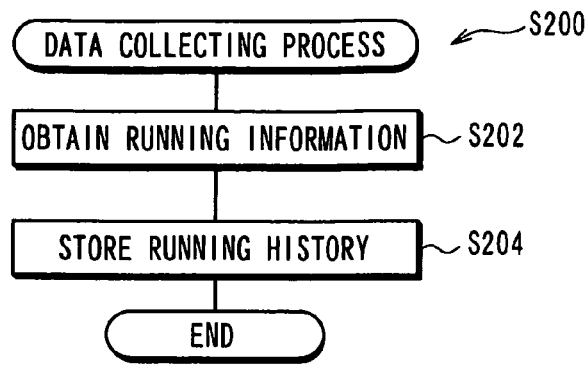
FIG. 4 is a flow chart illustrating a data collecting process.
FIG. 5 is a diagram illustrating one example of first information stored in a permanent storage medium.

Next, a data collecting process is executed to collect running information at S200. FIG. 4 shows a flow chart of the data collecting process S200.

The control unit 24, firstly, obtains the running information at S202 while the vehicle runs. In the present embodiment, a vehicle speed (km/h), a road gradient (%), and a drive force (W) are collected for each road link as the first information, and the road gradient (%), a running time period in the section (unit in second), a vehicle resting rate within the section (%), an electrical load (W) for driving the motor 3, and a vehicle speed (km/h) are collected as the second information. Also, simultaneously, a road identifier of the road, on which the vehicle is currently located, is identified. It should be noted that the vehicle resting rate of the section is computed by dividing a vehicle resting time period within the road section by the sum of the running time period and the vehicle resting time period in the road section. In the above, the vehicle resting time period indicates a time period, during which the vehicle is at rest or stops, and the running time period indicates a time period, during which the vehicle is running.

Next, a running history is stored at S204. Specifically, the first and second information sets collected at S202 are associated with the road identifier of the road, on which the vehicle is located, and the permanent storage medium 23 is caused to store the associated first and second information sets. Also, furthermore, when the present SOC reaches a predetermined upper limit value, an upper-limit SOC flag is associated with the road identifier of the road, and the permanent storage medium 23 is caused to store the associated upper-limit SOC flag. In contrast, when the present SOC reaches a predetermined lower limit value, a lower-limit SOC flag is associated with the road identifier of the road, and the permanent storage medium 23 is caused to the associated lower-limit SOC flag.

Typically, an upper limit value (for example, 75%) and a lower limit value (for example, 40%) of the charge amount of the battery is defined for the drive control apparatus of the hybrid electric vehicle as values in order to protect the battery.

It should be noted that when the charge amount of the battery exceeds the upper limit value, the HV control unit 10 prohibits the charge of the battery even when it is possible to charge the battery through the regeneration charge. Also, when the charge amount of the battery becomes less than the lower limit value, the HV control unit 10 starts compulsively charging the battery.

FIG. 5 shows one example of the first information stored in the permanent storage medium 23. It should be noted that in FIG. 5, data of the drive force is omitted. As shown in FIG. 5, the vehicle speed, the road gradient, the drive force, a start SOC, an end SOC, the upper-limit SOC flag, and the lower-limit SOC flag, which are collected for each section and associated with the corresponding road identifier, are stored in the permanent storage medium 23. It should be noted that road identifier serves as the link ID or the segment ID used for identifying each road section, for example.

In FIG. 3, it is determined at S104 whether the vehicle has reached the destination. More specifically, it is determined whether the vehicle has reached the destination by determining whether the present position of the vehicle falls within a certain range from the destination.

When the present position of the vehicle falls beyond the certain range of the destination, corresponding to NO at S104, the data collecting process at S200 is repeated. In other words, the process is repeated, in which the vehicle speed, the road gradient, and the drive force are collected for each road link, and in which the permanent storage medium 23 is caused to stored the above collected information set associated with the road identifier.

Figure 6:
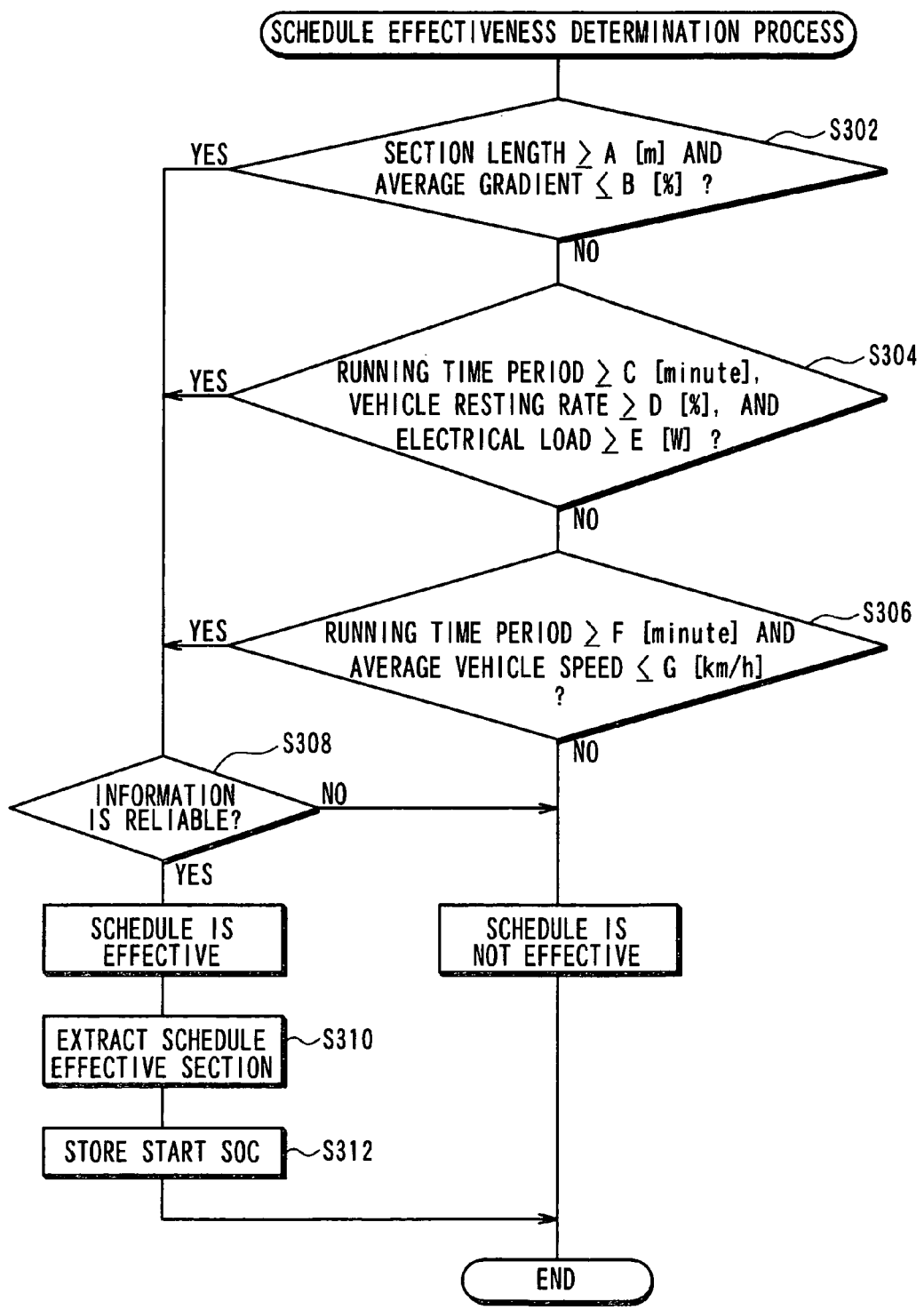
FIG. 6 is a flow chart illustrating a schedule effectiveness determination process.

When the present position of the vehicle falls within the certain range of the destination, corresponding to YES at S104, control proceeds to S300 for executing schedule effectiveness determination process. In other words, the schedule effectiveness determination process S300 will be executed after the vehicle has reached the destination along the route of interest. FIG. 6 shows a flow chart of the schedule effectiveness determination process S300. In the schedule effectiveness determination process S300, it is determined whether certain fuel efficiency improvement is obtainable by defining the schedule of the target value based on each information collected during the vehicle running. Based on the above determination, the schedule effective section, in which the certain fuel efficiency improvement is estimated to be obtainable based on the above defined schedule, is extracted from the sections on the route from the origin to the destination.

The schedule effective section of the present embodiment satisfies at least one of the following three conditions (1) to (3). In other words, a section that satisfies at least one of the following conditions (1) to (3) is extracted from the sections on the route from the origin to the destination as the schedule effective section. In the above, the extracted section may include multiple road links or alternatively may include one road link.

Condition (1), in which the schedule effective section has a section length that is equal to or greater than a predetermined threshold value (A m), and in which the schedule effective section has a downward gradient and an average value of the gradient that is equal to or less than a predetermined threshold value (B %).

Condition (2), in which the schedule effective section has the running time period that is equal to or greater than a predetermined threshold value (C minutes), and in which the schedule effective section has the vehicle resting rate within the section that is equal to or greater than a predetermined threshold value (D %), and in which the schedule effective section has the electrical load for driving the motor 3 that is equal to or greater than a predetermined threshold value (E W).

Condition (3), in which the schedule effective section has the running time period that is equal to or greater than a predetermined threshold value (F minutes), and in which the schedule effective section has an average vehicle speed that is equal to or less than a predetermined threshold value (G km/h).

In other words, it is determined at S302 whether there is a specific section among sections located between an origin (starting point) and the destination, which specific section corresponds to the above section of the condition (1). When, it is determined at S304 whether there is a specific section among the section located between the origin and the destination, which specific section corresponds to the above section of the condition (2). Then, it is determined at S306 whether there is a specific section among the section located between the origin and the destination, which specific section corresponds to the above section of the condition (3).

When there is any one of the sections of the conditions (1) to (3) among the sections located between the origin and the destination, it is determined at S308 whether each information used in the identification of the section that satisfies one of the conditions (1) to (3) is substantially reliable. In the above, each information used in the identification serves as the second information. In the present embodiment, the reliability of each information depends on whether the variation of each information used in the identification of the section that satisfies one of the conditions (1) to (3) is less than a predetermined threshold value. For example, at S302, in a case, where it is determined that there is the specific section that satisfies the condition (1) among the sections located between the origin and the destination, if the variation of the information used in the identification at S302 (in other words, the variation of each of the section length and the average gradient) is less than the predetermined threshold values, it is determined that the used information is substantially reliable.

When the variation of each information is less than the predetermined threshold value, the section that satisfies one of the conditions (1) to (3) is extracted as the schedule effective section. Then, the permanent storage medium 23 is caused to store the extracted section at S310. Specifically, the permanent storage medium 23 is caused to store the sections located between the origin and the destination and also store the schedule effective section among the above sections.

Next, the start SOC of the schedule effective section is determined based on each information collected during the vehicle running, and the permanent storage medium 23 is caused to store the start SOC of the schedule effective section at S312. Then, the present process is ended. In the above, the start SOC means the SOC at the start point of the schedule effective section, for example.

Figure 7:
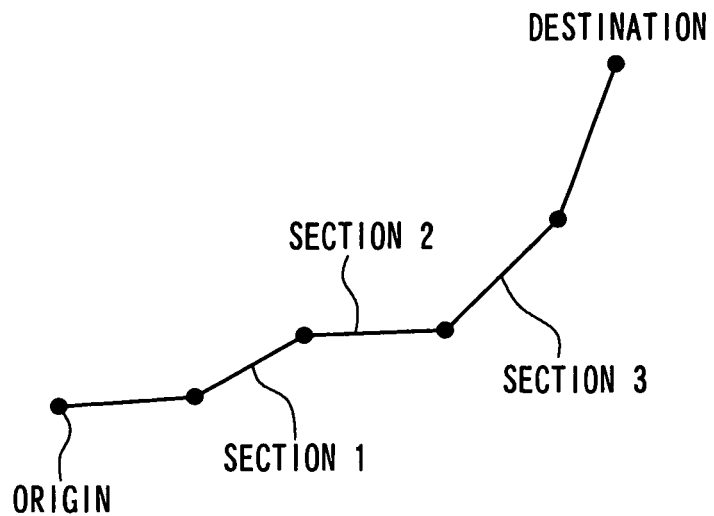
FIG. 7 is a diagram for explaining a schedule effective section.

FIG. 7 shows one example of the schedule effective section extracted by the schedule effectiveness determination process. In FIG. 7, section 1 to section 3 are extracted from the route from the origin to the destination as the schedule effective section.

Figure 8:
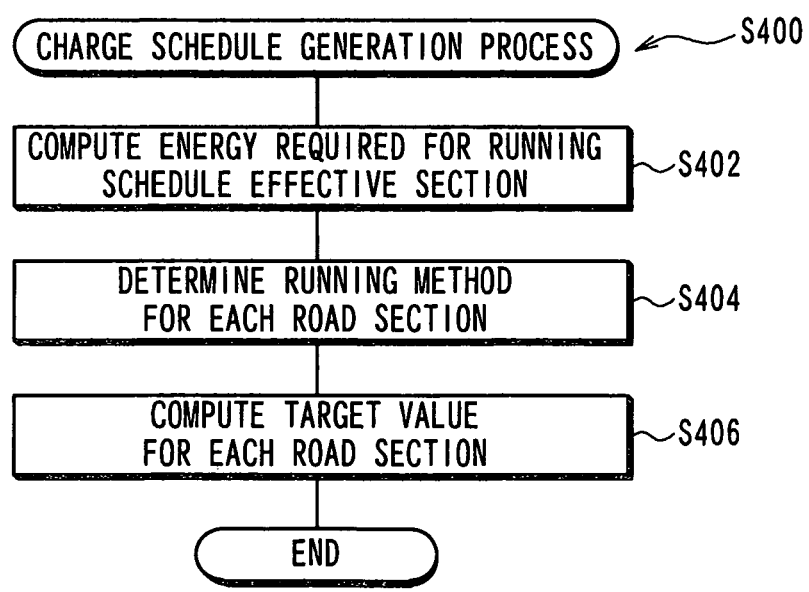
FIG. 8 is a flow chart for a charge schedule generation process.

In FIG. 3, next, a charge schedule generation process is executed at S400. FIG. 8 shows a flow chart of the charge schedule generation process S400. In the charge schedule generation process S400, the schedule of the running methods of the vehicle in the schedule effective section is made as the charge schedule of the schedule effective section.

Specifically, firstly, at S402, the start SOC of the schedule effective section is read from the permanent storage medium 23, and the energy required for the vehicle to run the schedule effective section is computed based on the running information collected and stored in the permanent storage medium 23 during the vehicle running. It should be noted that a method for computing the required energy is a known art (see, for example, JP-A-2001-183150, "development of new energy automobile P. 123 to 124" CMC Publishing Co., Ltd.). Thus, the description of the computation is omitted.

Next, control proceeds to at S404, where the running method for each road section is determined based on the running information stored in the permanent storage medium 23. Specifically, the reference SOC is retrieved from the HV control unit 10, and power generation efficiency and assist efficiency are computed for the schedule effective section based on the reference SOC and the running information, which is stored in the permanent storage medium 23 during the vehicle running from the origin to the destination. Then, the control method, such as the regeneration charge, generation, assist, are determined for each road section in the schedule effective section.

Figures 9A, 9B:
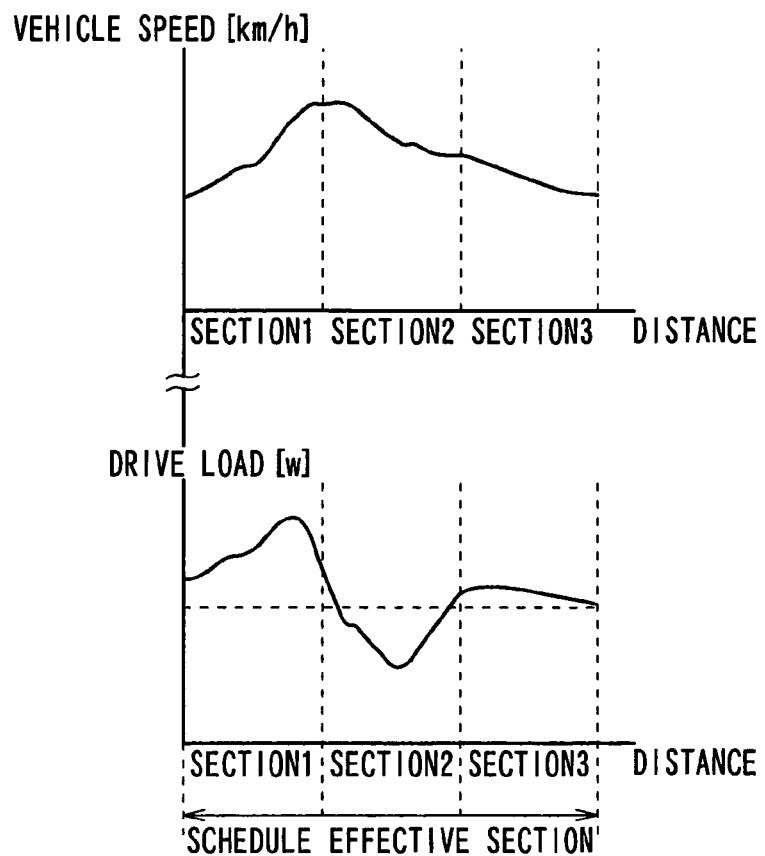
FIG. 9A is a diagram illustrating one example of a vehicle speed and a drive force collected in the schedule effective section.
FIG. 9B is a diagram illustrating one example a running method determined based on each road identifier in the schedule effective section.

FIG. 9A shows one example of the vehicle speed and the drive force collected in the schedule effective section shown in FIG. 7. Also, FIG. 9B shows one example of the control schedule for the schedule effective section shown in FIG. 7.

Next, at S406, an SOC management schedule (corresponding to the schedule of the control index) for the schedule effective section is generated based on the running information, which is collected and stored in the permanent storage medium 23 during the vehicle running from the origin to the destination. In other words, the SOC management schedule for the schedule effective section is generated based on information (first information), which is stored in the permanent storage medium 23, and which is used for defining the control target value. The SOC management schedule indicates an estimated change of a target SOC (control target value) to the destination. It should be noted that the estimation of the change of the target SOC is already known (see, for example, JP-A-2001-183150, "development of new energy automobile, P. 123 to 124" CMC Publishing Co., Ltd.), and thereby the details are not described. FIG. 9B shows one example of the estimated change of the target SOC. As shown in FIG. 9B, in the present embodiment, the SOC management schedule, which includes the target SOC defined correspondingly to the road identifier in the schedule effective section, is generated.

Figure 10:
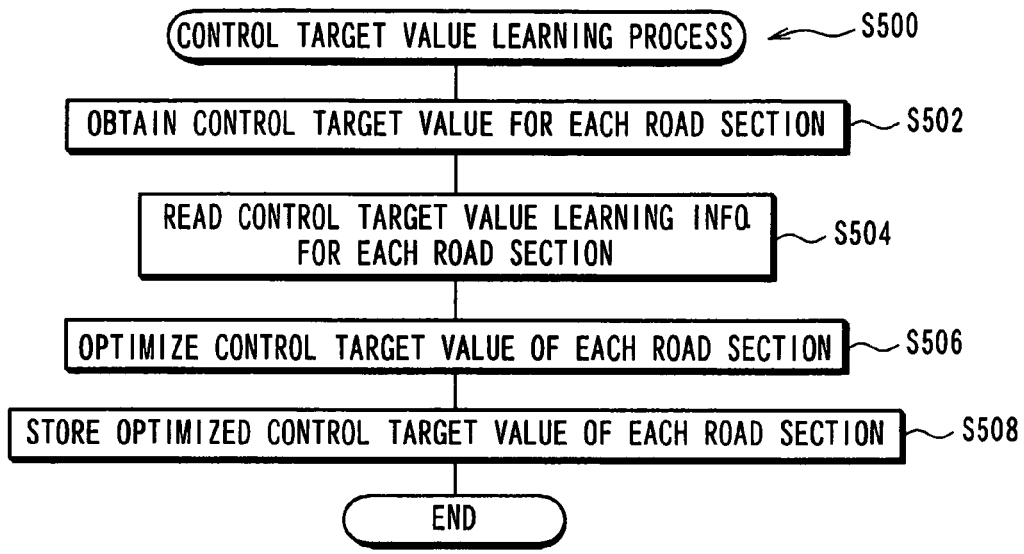
FIG. 10 is a flow chart illustrating a control target value learning process.

In FIG. 3, next, a control target value learning process S500 is executed in order to learn the control target value and store the control target value in the permanent storage medium 23. The flow chart of the control target value learning process is shown in FIG. 10.

In the control target value learning process, firstly, the control target value is obtained for each road section at S502. Specifically, each control target value (the target SOC), which has been computed at the process S400 correspondingly to the road identifier in the SOC management schedule, is obtained from the permanent storage medium 23.

Next, control target value learning information is read for each road section at S504. In other words, when a control target value of the schedule effective section of the route of interest, on which the vehicle has just run, has been previously computed and been already stored in the permanent storage medium 23, the control target value of the schedule effective section on the route of interest is read from the permanent storage medium 23. It should be noted that when the previous control target value of the schedule effective section on the route of interest has not yet been stored in the permanent storage medium 23, the control target value is not read and control proceeds to S506.

At S506, the control target value is optimized for each road section. When the previous control target value of the schedule effective section on the route of interest has already been stored in the permanent storage medium 23, the previous control target value of the schedule effective section on the route of interest stored in the permanent storage medium 23 and the control target value currently obtained at S502 are simply averaged to obtain an average value that serves as a new control target value. In contrast, when the previous control target value of the schedule effective section on the route of interest has not yet been stored in the permanent storage medium 23, the control target value obtained at S502 is made serve as the new control target value.

Next, the optimized or updated control target value (or new control target value) is stored in the permanent storage medium 23 at S508. Specifically, each control target value (the target SOC), which is associated with the origin, the destination, and the road identifier, is stored in the permanent storage medium 23.

Figure 11:
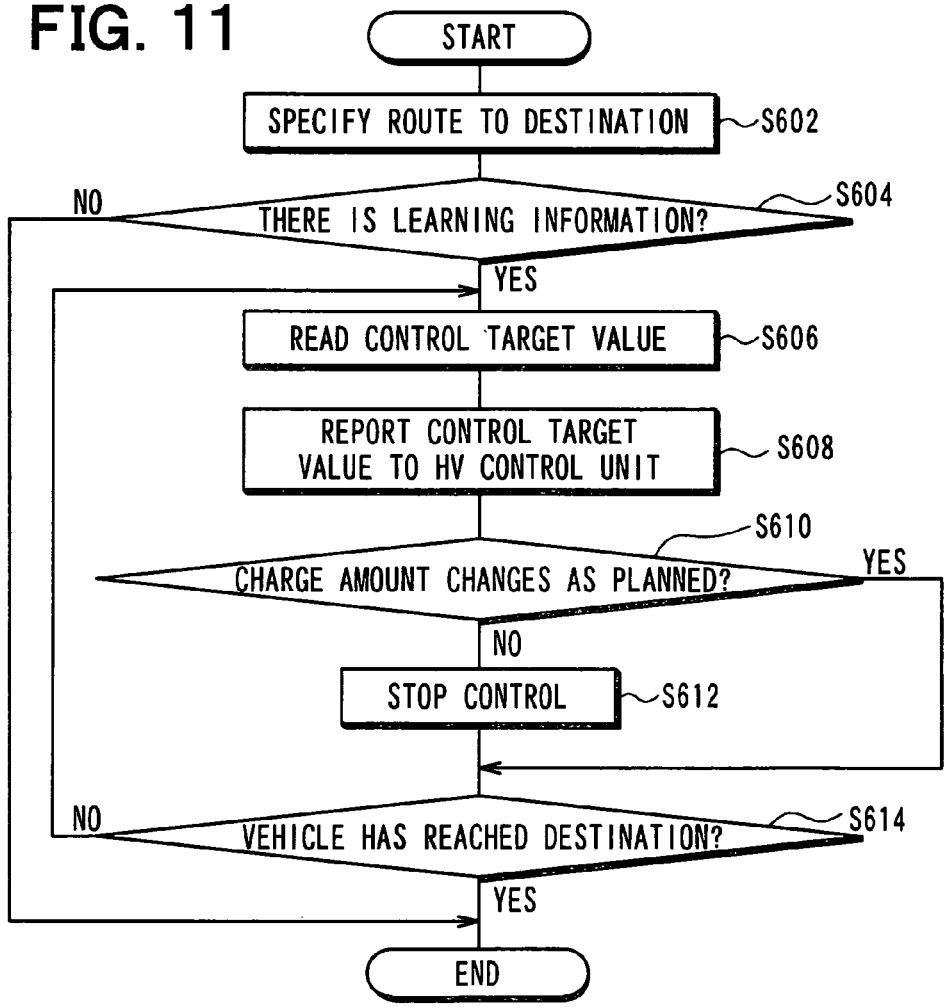
FIG. 11 is a flow chart during a running-time process.

FIG. 11 shows a flow chart of a running-time process. The control unit 24 executes a process shown in FIG. 11 in response to the operation of the occupant.

Firstly, the schedule effective section is specified at S602. Specifically, when the destination is identified in response to the operation of the occupant, a route from the present position of the vehicle (or the origin) to the destination is specified as the schedule effective section.

Next, it is determined at S604 whether there is learning information. Specifically, when the previously computed SOC management schedule for the schedule effective section on the route of interest from the origin to the destination is stored in the permanent storage medium 23, it is determined that there is the learning information.

When the previously computed SOC management schedule for the schedule effective section on the route of interest is stored in the permanent storage medium 23, corresponding to YES at S604, control proceeds to S606, where the control target value is read. Specifically, the control target value of each section, which value has been previously defined in the SOC management schedule for the schedule effective section, is read from the permanent storage medium 23.

Next, the control target value at the present position of the vehicle is reported to the HV control unit at S608. When the vehicle is located within the schedule effective section, the control target value at the present position of the vehicle is reported to the HV control unit. In contrast, when the vehicle is not located in the schedule effective section, the reporting of the control target value is stopped. In the above case, the HV control unit 10 performs a drive control such that the charge amount (SOC) of the battery 9 becomes closer to a default control target value, such as the reference SOC of 60%.

It is determined at S610 whether the present SOC changes to become closer to the control target value in order to determine whether the charge amount of the battery 9 changes as planned or accordingly to the SOC management schedule.

When the present SOC changes to become closer to the control target value, corresponding to YES at S610, control proceeds to S614, where it is determined whether the vehicle has reached a position within a predetermined range from the destination in order to determine whether the vehicle has reached the destination.

When it is determined that the vehicle has not reached the position within the predetermined range from the destination, corresponding to NO at S614, control returns to S606.

Also, when the present SOC does not change to become closer to the control target value, corresponding to NO at S610, control proceeds to S612, where the drive control is stopped even when the vehicle has not reached the position within the predetermined range from the destination. Specifically, the reporting of the control target value is stopped, and the HV control unit 10 performs the drive control such that the charge amount of the battery 9 becomes closer to the default control target value, such as the reference SOC of 60%.

When the vehicle reaches the position within the predetermined range from the destination, corresponding to YES at S614, the process is ended.

Due to the above configuration, the first information and the second information are collected at predetermined intervals. More specifically, the first information is used for defining the control target value, and the second information is used for extracting the schedule effective section, in which certain fuel efficiency improvement is estimated to be obtainable when the schedule of the control target value is defined and the drive control of the engine and the motor is performed based on the defined schedule. The schedule effective section is extracted from the route from the origin to the target (destination) based on the second information, and the schedule of the control target value is defined based on the first information for each of predetermined sections in the extracted effective section such that fuel consumption of the engine is reduced in the schedule effective section. Then, the drive control is performed based on the schedule of the above defined control target value. In other words, the schedule of the control target value is made to reduce the fuel consumption of the engine for the schedule effective section, and then the drive control is performed based on the above schedule of the control target value in the schedule effective section. In contrast, when the section is not estimated as the schedule effective section, the schedule of the control target value is not defined, and thereby the driver is capable of driving the vehicle with high fuel efficiency in accordance with the drive condition around the vehicle. As a result, it is possible to effectively improve the fuel efficiency of the hybrid electric vehicle. It should be noted that the first information may be the road gradient, the vehicle speed, and the drive force. Also, the second information may be the section length, the road gradient, the running time period of the section, the vehicle resting rate of the section, the electrical load for driving the motor 3, and the vehicle speed. Also, the predetermined interval may correspond to the road link obtainable from the map data and may be a predetermined distance or a predetermined time period alternatively. Also, the set of the extracted sections may be, for example, a set of the road links. For example, each section may include multiple road links or may include only one road link, alternatively.

Also, the schedule effective section satisfies at least one of the following conditions. In a first condition, the schedule effective section has the section length that is equal to or greater than a predetermined threshold value, and simultaneously the schedule effective section has a downward gradient and an average gradient equal to or less than a predetermined threshold value. In a second condition, the schedule effective section has the running time period of the section equal to or greater than a predetermined threshold value, and simultaneously the schedule effective section has the vehicle resting rate equal to or greater than a predetermined threshold value, and simultaneously, the schedule effective section has electrical load for driving the motor equal to or greater than a predetermined threshold value. In a third condition, the schedule effective section has the running time period equal to or greater than a predetermined threshold value, and simultaneously the schedule effective section has an average vehicle speed equal to or less than a predetermined threshold value.

Also, when the variation of the second information is equal to or less than a predetermined threshold value, the schedule effective section is extracted from the sections on the route from the origin to the target point (destination) based on the second information. As a result, it is possible to accurately extract the schedule effective sections.

As described above, the present embodiment shows the example method for controlling the engine 1 and the motor 3 of the hybrid electric vehicle based on the state of charge (SOC) of the battery mounted to the vehicle. In the method, the first information and the second information of each of multiple sections (road sections) within the route from the origin to the destination are collected while the vehicle runs along the route. The collected first and second information of each of the multiple sections are stored in the storage device 23 (see data collecting process in FIG. 2). Multiple continuous sections (for example, sections 1 to 3 in FIG. 7) are extracted as a schedule effective section from the multiple sections within the route based on the second information stored in the storage device 23 after the vehicle has reached the destination, and the continuous sections are located adjacent to each other in the route (see the schedule effectiveness determination process in FIG. 6). A schedule of the SOC for each of the multiple continuous sections (or a schedule of the SOC for each road section) is defined based on the first information stored in the storage device 23 such that fuel consumption of the engine 1 is reduced in the schedule effective section (see the charge schedule generation process in FIG. 8). The defined schedule of the SOC is stored in the storage device 23 (see control target value learning process in FIG. 10). The engine 1 and the motor 3 of the vehicle are controlled based on the schedule of the SOC stored in the storage device 23 when the vehicle runs along the route in a next operation (see the running-time process in FIG. 11). As a result, it is possible to achieve the advantage as described above.

Second Embodiment

In the first embodiment, the second information employs the section length, and the road gradient, and the schedule effectiveness determination process shown in FIG. 6 is executed. However, in the present embodiment, the running on the road having a large gradient, such as a mountain road, is targeted. Thus, in order to effectively collect regeneration electric power in the downslope, where it is possible to charge the battery through the regeneration charge, the schedule effective section is extracted in the schedule effectiveness determination process of the present embodiment such that the SOC is substantially reduced systematically or intentionally during the section located upstream of the downslope. As above, the SOC is employed as the second information in the present embodiment.

Figure 12:
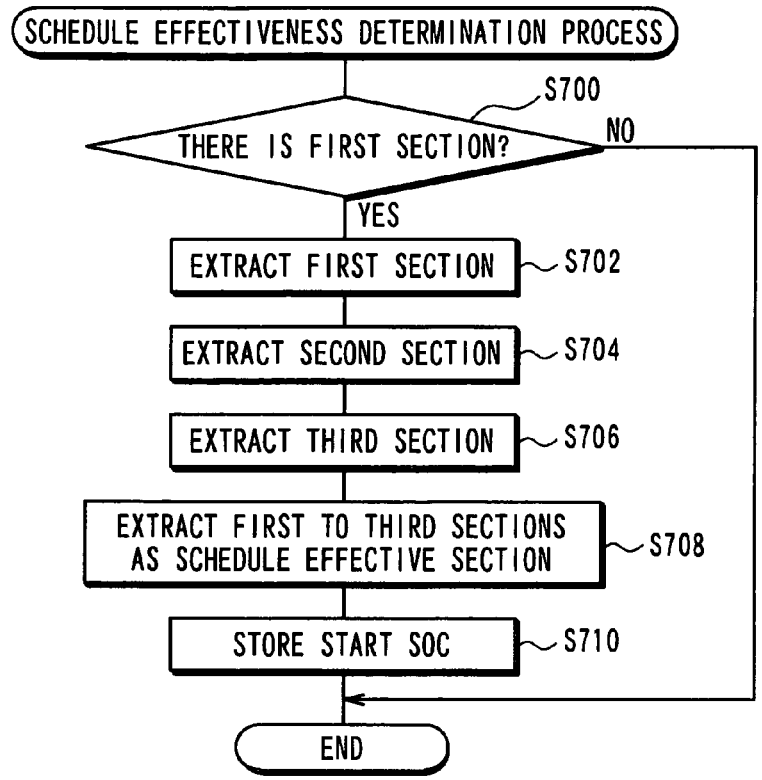
FIG. 12 is a flow chart illustrating a schedule effectiveness determination process according to the second embodiment of the present invention.

FIG. 12 shows the schedule effectiveness determination process according to the present embodiment. In the schedule effectiveness determination process, firstly, it is determined at S700 whether there is a specific section among the sections located between the origin and the destination. For example, in the specific section, the SOC collected while the vehicle runs, reaches a predetermined upper limit value. Specifically, by referring to the upper-limit SOC flag stored in the permanent storage medium 23, it is determined whether there is the specific section associated with the upper-limit SOC flag among the sections located between the origin and the destination.

When there is no specific section associated with the upper-limit SOC flag among the sections located between the origin and the destination, corresponding to NO at S700, the present process is ended.

Figure 13:
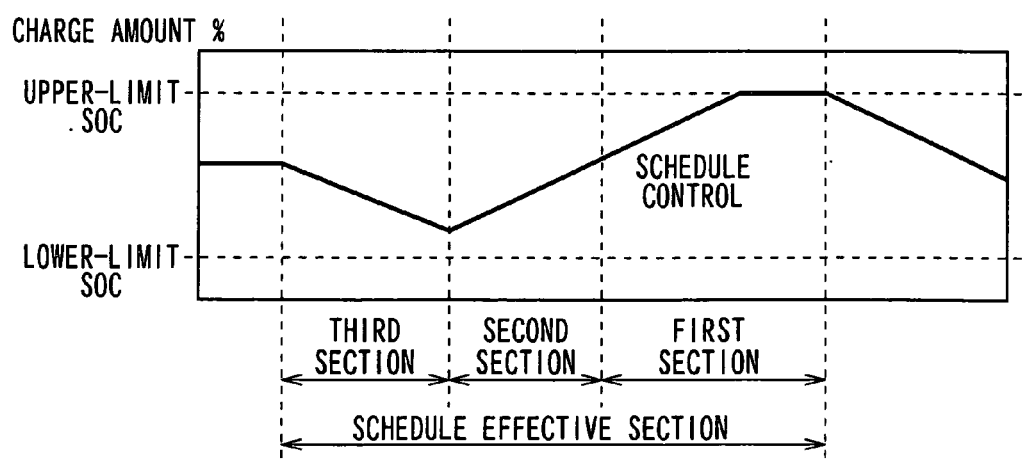
FIG. 13 is a diagram for explaining a schedule effective section according to the second embodiment.

Also, as shown in FIG. 13, when there is the section associated with the upper-limit SOC flag among the sections located between the origin and the destination, corresponding to YES at S700, control proceeds to S702, where the above associated section is extracted as the first section.

It should be noted that the first section indicates a section, in which the SOC increases and reaches the upper limit, and thereby it is impossible to fully store the regeneration electric power. Specifically, the first section corresponds to a downslope section. Thus, accordingly, when the first section has the longer section length, the more amount of the regeneration electric power is not stored accordingly, and thereby the fuel efficiency deteriorates accordingly.

Next, at S704, a section immediately upstream of the first section in the vehicle running direction is extracted as the second section. For example, if the charge amount of the battery (SOC) keeps increasing over multiple continuous sections (multiple links), the second section corresponds to the continuous multiple links.

It should be noted that in the second section, the SOC increases due to the regeneration electric power. Typically, the second section is a downslope similar to the first section.

Next, at S706, a specific section, which is located immediately upstream of the second section, and which extends from an upstream end of the second section by a predetermined distance, is extracted as the third section. If the above specific section that is located immediately upstream of the second section and that extends from the second section by the predetermined distance extends over continuous multiple links, the third section corresponds to the section having the continuous multiple links. It should be noted that the length (predetermined distance) of the third section is determined such that the SOC will not become less than the lower-limit SOC even when the vehicle runs the third section by the motor as the power source.

It should be noted that in the third section, the vehicle is operated by the motor running mode in order to reduce the SOC that will be increased by the regeneration charge in the coming first and second sections. The third section may be a flat road or a upslope. It should be noted that in the third section, the motor running mode is executed such that the SOC is reduced stepwise systematically or intentionally, and thereby it is possible to effectively reduce the amount of the regeneration electric power that would be otherwise wasted. As a result, it is possible to effectively improved the fuel efficiency in the first section.

Next, the first to third sections are extracted as the schedule effective section, in which the certain fuel efficiency improvement is estimated to be obtainable by defining the schedule of the target value, and then the permanent storage medium 23 is caused to store the first to third sections (plurality of continuous sections) as the schedule effective section at S708. Specifically, the permanent storage medium 23 is caused to store the route between the origin and the destination and the schedule effective section among the sections on the route.

Next, the start SOC of the schedule effective section is determined based on each information collected during the vehicle running, and the permanent storage medium 23 is caused to store the start SOC of the schedule effective section at S710. Then, the present process is ended.

After the execution of the above schedule effectiveness determination process, the charge schedule generation process shown in FIG. 8 is executed for the schedule effective section extracted in the schedule effectiveness determination process.

The charge schedule is generated such that the motor running mode is executed in the third section of FIG. 13 that is immediately upstream of the second section, in which the charge amount of the battery is to be increased, such that the SOC is systematically and intentionally reduced in order to prevent the SOC from staying at the upper-limit SOC in the first section, and thereby to prevent the failure to fully store the regeneration electric power.

As above, the schedule effective section includes the first to third sections. More specifically, in the first section, the charge amount of the battery reaches a predetermined upper limit value. The second section is located immediately upstream of the first section, and in the second section, the charge amount of the battery is increased. The third section is located immediately upstream of the second section and extends from the second section by a predetermined distance. In other words, it is possible to systematically and intentionally reduce the charge amount of the battery in the third section. The third section is located immediately upstream of the second section, in which the charge amount of the battery is to be increased. As a result, it is possible to prevent the charge amount of the battery from being kept at the predetermined upper limit value in the first section that is located downstream of the second section. Accordingly, it is possible to effectively improve the fuel efficiency.

Third Embodiment

In the third embodiment, in order to prevent the forcible charge of the battery from being started in a traffic jam section, in which the SOC is likely to be reduced, the schedule effectiveness determination process is executed based on the SOC as the second information in order to systematically and intentionally increase the SOC before the traffic jam section.

Figure 14:
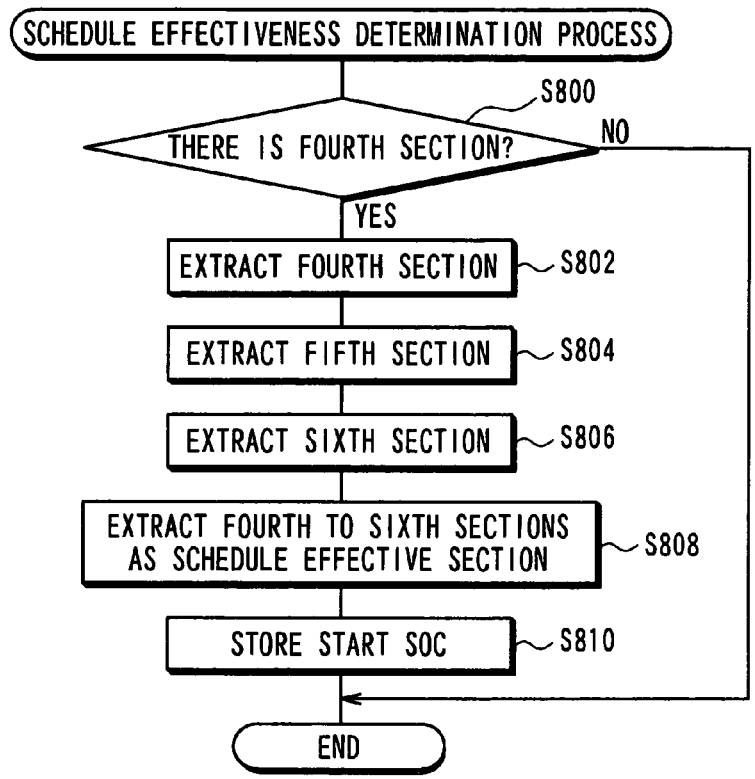
FIG. 14 is a flow chart illustrating a schedule effectiveness determination process according to the third embodiment of the present invention.

FIG. 14 illustrates a schedule effectiveness determination process of the present embodiment. In the schedule effectiveness determination process, firstly, it is determined at S800 whether there is a specific section, in which the SOC collected during the vehicle running reaches a predetermined lower limit value, among the sections located on the route between the origin and the destination. Specifically, by referring to the lower-limit SOC flag stored in the permanent storage medium 23, it is determined whether there is a section associated with the lower-limit SOC flag among the sections located between the origin and the destination.

When there is no section associated with the lower-limit SOC flag among the sections located between the origin and the destination, corresponding to NO at S800, the present process is ended.

Figure 15:
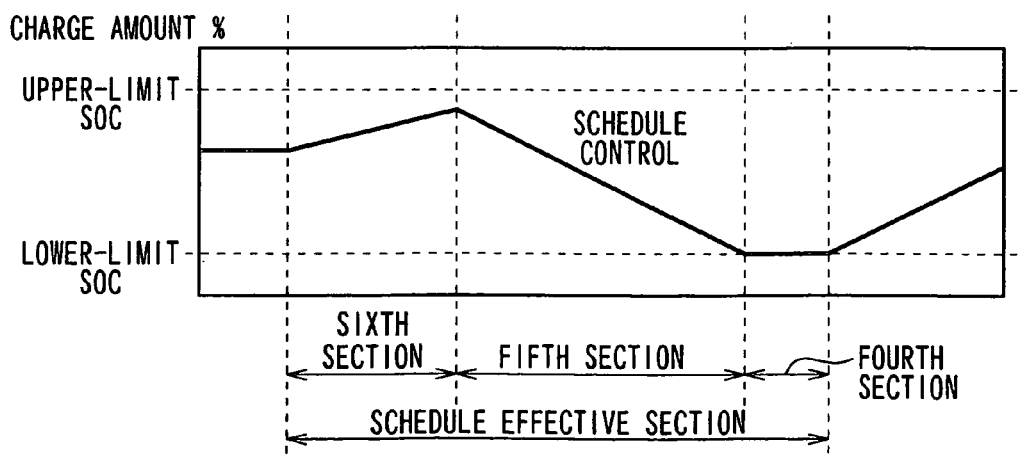
FIG. 15 is a diagram for explaining a schedule effective section according to the third embodiment.

Also, as shown in FIG. 15, when there is the section associated with the lower-limit SOC flag among the sections located between the origin and the destination, or in other words, when there is a section, in which the SOC reaches the lower-limit SOC, corresponding to YES at S800, control proceeds to S802, where the section associated with the lower-limit SOC flag is extracted as the fourth section.

It should be noted that in the fourth section, the SOC reaches to the lower-limit due to the traffic jam, and thereby the forcible charge is to be started. When the forcible charge is started while the vehicle stops or travels at a low speed due to the traffic jam, the fuel efficiency deteriorate in general.

Next, control proceeds to S804, where the fifth section, which is located immediately upstream of the fourth section, and in which the charge amount of the battery (SOC) is reduced, is extracted.

Next, control proceeds to S806, where the sixth section, which is located immediately upstream of the fifth section, and which extends from the start point of the fifth section by the predetermined distance, is extracted. It should be noted that the above predetermined distance is determined such that the SOC will not increase equal to or greater than the upper-limit SOC when the vehicle travels using the engine as the power source.

It should be noted that in the sixth section, the engine running mode is performed such that the SOC is increased by the regeneration charge for the preparation of the expected increase of the SOC in the fourth and fifth sections. As above, the engine running mode is executed in the sixth section in order to systematically and intentionally charge the battery to increase the SOC. As a result, it is possible to prevent the start of the forcible charge of the battery in the fourth section due to the traffic jam.

Next, control proceeds to S808, where the fourth to sixth sections (plurality of continuous sections) are extracted as the schedule effective section and are stored in the permanent storage medium 23. More specifically, the permanent storage medium 23 is caused to store the sections on the route from the origin to the destination and the schedule effective section among the sections of the route of interest.

Next, the start SOC of the schedule effective section is determined based on each information collected during the vehicle running, and the start SOC of the schedule effective section is stored in the permanent storage medium 23 at S810. Then, present process is ended.

After the schedule effectiveness determination process is executed, the charge schedule generation process shown in FIG. 8 is executed to the schedule effective section extracted in the schedule effectiveness determination process as above.

The engine running mode is performed in the sixth section in order to increase SOC such that the SOC in the fourth section of FIG. 15 is prevented from being kept at the lower-limit SOC, and thereby to prevent the deterioration of the fuel efficiency caused by the forcible charge of the battery in the fourth section.

As above, the schedule effective section includes the first section (the fourth section in FIG. 15), the second section (the fifth section in FIG. 15), and the third section (the sixth section in FIG. 15). In the first section, the charge amount of the battery reaches the predetermined lower limit value. The second section is located immediately upstream of the first section, and the charge amount of the battery is reduced in the second section. The third section is located immediately upstream of the second section and extends by the predetermined distance from the start point of the second section. In other words, it is possible to systematically and intentionally increase the charge amount of the battery in the third section that is located immediately upstream of the second section, in which the charge amount of the battery is reduced. As a result, in the first section that is located downstream of the second section in the vehicle running direction, it is possible to prevent the charge amount of the battery from being kept at the predetermined lower limit value, and thereby it is possible to effectively improve the fuel efficiency.

Other Embodiment

Figure 16:
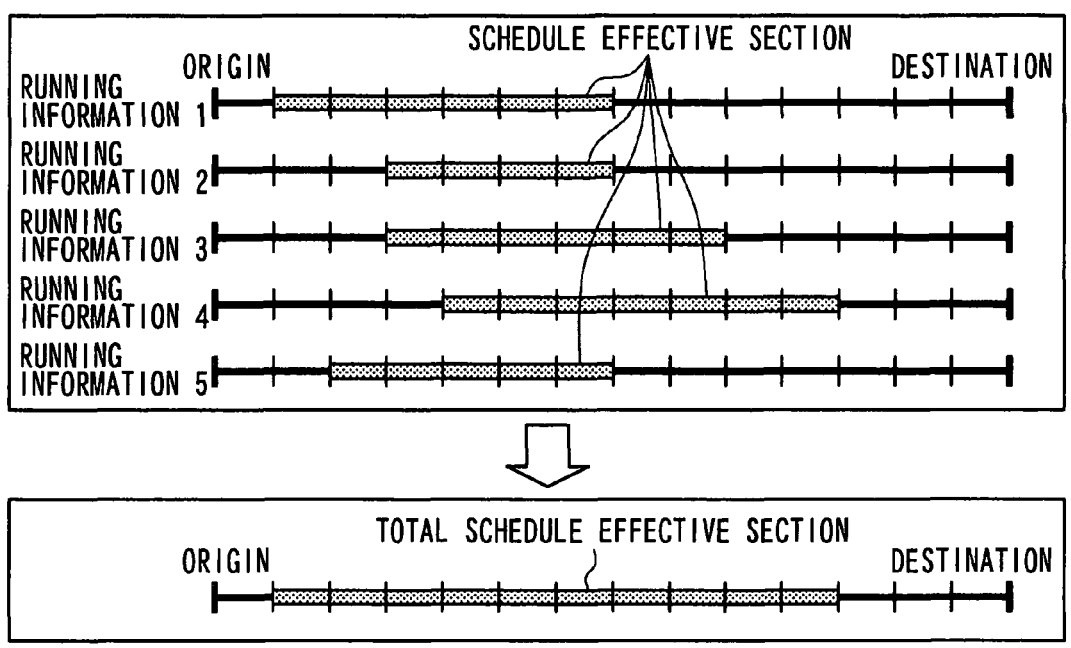
FIG. 16 is a diagram for explaining extraction of a an example of a schedule effective section according to the other embodiment of the present invention.

In the first to third embodiments, the schedule effective section is extracted from sections within the route from the origin to the target based on the second information, and the schedule of the target SOC is defined for each of the predetermined sections of the schedule effective section based on the first information such that fuel consumption of engine is reduced in the schedule effective section. However, when an additional schedule effective section (second schedule effective section) is extracted from the route from the origin to the target based on the second information in addition to the known schedule effective section (first schedule effective section), the schedule of the target SOC may be defined for each of the predetermined sections of the known schedule effective section and the additional schedule effective section (first and second schedule effective section) based on the first information such that the fuel consumption of the engine is reduced in the known schedule effective section and the additional schedule effective section. For example, as shown in FIG. 16, after running information 1 is collected in the first running of the route of interest, running information 2 to running information 5 are collected respectively during the second to fifth running of the route of interest. When an additional schedule effective section is newly extracted based on the running information 2 to running information 5, the above new schedule effective section is included in the schedule effective section. Thus, the schedule of the target SOC is determined at each predetermined section of the updated schedule effective section (total schedule effective section) such that the fuel consumption of the engine is reduced. As a result, it is possible to effectively improve the accuracy of extracting the section, in which the certain fuel efficiency improvement is expected to be obtainable.

Also, in the above first embodiment, the vehicle speed, the road gradient, and the drive force are collected, during the vehicle running, as the first information that is used for defining the schedule of the control target value. Then, the schedule of the control target value is defined for each predetermined section within the schedule effective section using the first information such that the fuel consumption of the engine is effectively reduced. However, the first information may employ other information other than the vehicle speed, the road gradient, and the drive force for the definition of the schedule of the control target value.

Also, in the first embodiment, the second information is used to extract the schedule effective section, in which the certain fuel efficiency improvement is expected to be obtained by defining the schedule of the control target value and by performing the drive control of the engine and the motor based on the defined schedule. For example, the section length, the road gradient, the running time period of the section, the vehicle resting rate within the section, the electrical load for driving the motor 3, and the vehicle speed are collected as the second information while the vehicle runs. Then, the schedule effective section on the route of interest is extracted based on the second information. However, the schedule effective section may be alternatively extracted based on information other than the second information.

Also, in the first and second embodiments, after the vehicle has run the route of interest, the schedule of the control target value of the schedule effective section is defined based on the first and second information collected during the vehicle running. Then, the schedule of the control target value is optimized and stored in the permanent storage medium 23, and the drive control will be performed, in the next vehicle running, in accordance with the schedule of the control target value of the schedule effective section stored in the permanent storage medium 23. However, for example, the first and second information collected during the vehicle running may be alternatively learned at every predetermined distance instead of learned after the vehicle running on the route of interest. Then, based on the learned second information, the schedule effective section is extracted from the sections on the route from the origin to the target point (destination). Then, the schedule of the control target value for reducing the fuel consumption of the engine in the schedule effective section may be defined using the learned first information.

Also, in the above embodiment, the running information for defining the control target value is collected every predetermined distance and is stored in the permanent storage medium 23. Alternatively, for example, the running information for defining the control target value may be collected at predetermined time intervals and may be stored in the permanent storage medium 23.

Also, the above embodiment shows an example, in which the control target value (the target SOC) of the charge amount of the battery, which supplies electric power to the motor, is employed as the control index, and the schedule of the control index is defined. Alternatively, data other than the target SOC of the battery may be employed as an alternative control index, and the schedule of the alternative control index may be defined instead. In an example case, the SOC at the time of entering a certain section may be referred to as "B", and the SOC at the time of exiting the certain section may be referred to as "C". In the above example case, the alternative control index may be employed provided that it is possible to change the SOC from "B" to "C" in the certain section.

Also, in the above embodiment, as shown in FIG. 16, the schedule effective section includes continuous sections in the route from the origin to the destination. Alternatively, for example, there may be two separate schedule effective sections in the route from the origin to the destination, and the first one and the second one of the schedule effective sections are separate from each other. In the above case, each of the first and second schedule effective sections has multiple road sections, for example.

In the above embodiments, the permanent storage medium 23 corresponds to a storage device, S200 corresponds to information storing means, S302 to S310 correspond to schedule effective section extracting means, S400 and S500 correspond to control index storage controlling means, and S600 correspond to assist control process means.

Additional advantages and modifications will readily occur to those skilled in the art. The invention in its broader terms is therefore not limited to the specific details, representative apparatus, and illustrative examples shown and described.

What is claimed is:

1. A drive control apparatus mounted to a hybrid electric vehicle that employs an engine and a motor as a running power source, wherein the drive control apparatus is configured to perform drive control of the engine and the motor based on a state of charge (SOC), such that a residual amount of battery, which is for driving the motor, reaches a target SOC, which is a predetermined charge amount of the battery, the drive control apparatus comprising:

means for collecting first information and second information at predetermined distance intervals while the vehicle runs; and means for storing the collected first and second information in a storage device, the first information being used for defining the target SOC, the second information being used for extracting a schedule effective section from a route from an origin to a destination, in which effective section certain fuel efficiency improvement is obtainable by defining a schedule of the target SOC and by performing the drive control of the engine and the motor based on the defined schedule;

means for extracting, in a next running, the schedule effective section from the route based on the second information stored in the storage device;

means for defining the schedule of the target SOC of each of a plurality of predetermined sections within the schedule effective section based on the first information stored in the storage device such that fuel consumption of the engine is reduced in the schedule effective section; and means for causing the storage device to store the defined schedule of the target SOC; and means for performing the drive control based on the schedule of the target SOC in a section in which the storage device stores the schedule of the target SOC; and means for performing the drive control independently based on a driving operation of an occupant in a section in which the storage device does not store the schedule of the target SOC, wherein the extracting means is further configured to extract, as the schedule effective section:

a first section, in which a charge amount of the battery reaches a predetermined upper limit value;

a second section, which is immediately upstream of the first section, and in which the charge amount of the battery increases; and a third section, which is immediately upstream of the second section, and which extends from the second section by a predetermined distance, and the defining means is further configured to define the schedule of the target SOC, such that the charge amount of the battery is systematically reduced in the third section immediately upstream of the second section, in which the charge amount of the battery is to be increased, in order to prevent the charge amount of the battery from staying at the predetermined upper limit value in the first section.

2. The drive control apparatus according to claim 1, wherein:

the storing means is further configured to cause the storage device to store the second information of a specific section and to cause the storage device to store the second information of a new section in the next running, when the extracting means extracts a new schedule effective section, in which certain fuel efficiency improvement is obtainable by defining the schedule of the target SOC based on the second information in a plurality of sections stored in the storage device, the defining means adds the new schedule effective section, which is newly extracted by the extracting means, to all schedule effective sections, in which certain fuel efficiency improvement is estimated to be obtainable by defining the schedule of the target SOC.

3. A method for controlling an engine and a motor of a hybrid electric vehicle based on a state of charge (SOC) of a battery, which is mounted to the vehicle for driving the motor, such that a residual amount of the battery reaches a target SOC which is a predetermined charge amount of the battery, the method comprising:

collecting first information and second information of each of a plurality of sections within a route from an origin to a destination, at a predetermined distance interval while the vehicle runs along the route;

storing the collected first and second information of each of the plurality of sections in a storage device;

extracting as a schedule effective section from the plurality of sections within the route based on the second information stored in the storage device after the vehicle has reached the destination, the continuous sections being located adjacent to each other in the route;

a first section, in which a charge amount of the battery reaches a predetermined upper limit value;

a second section, which is immediately upstream of the first section, and in which the charge amount of the battery increases; and a third section, which is immediately upstream of the second section, and which extends from the second section by a predetermined distance;

defining a schedule of the SOC for each of the plurality of continuous sections based on the first information stored in the storage device such that fuel consumption of the engine is reduced in the schedule effective section, and such that the charge amount of the battery is systematically reduced in the third section immediately upstream of the second section, in which the charge amount of the battery is to be increased, in order to prevent the charge amount of the battery from staying at the predetermined upper limit value in the first section;

storing the defined schedule of the SOC in the storage device;

controlling the engine and the motor of the vehicle based on the schedule of the SOC stored in the storage device when the vehicle runs along the route in a section in which the storage device stores the schedule of the target SOC in a next operation; and controlling the engine and the motor of the vehicle independently based on a driving operation of an occupant when the vehicle runs along the route in a section in which the storage device does not store the schedule of the target SOC in a next operation.

* * * * *